United States Patent
Eguchi et al.

(10) Patent No.: US 6,807,015 B2
(45) Date of Patent: Oct. 19, 2004

(54) FOCUSING METHOD FOR A ZOOM LENS SYSTEM

(75) Inventors: Masaru Eguchi, Saitama (JP); Takayuki Ito, Saitama (JP)

(73) Assignee: PENTAX Corporation, Tokyo (JP)

( * ) Notice: Subject to any disclaimer, the term of this patent is extended or adjusted under 35 U.S.C. 154(b) by 227 days.

(21) Appl. No.: 09/818,504

(22) Filed: Mar. 28, 2001

(65) Prior Publication Data

US 2001/0043405 A1 Nov. 22, 2001

(30) Foreign Application Priority Data

Mar. 31, 2000 (JP) ........................................ 2000-097601

(51) Int. Cl.⁷ .............................................. G02B 15/14
(52) U.S. Cl. ...................................... 359/690; 359/683
(58) Field of Search ................................. 359/690, 684, 359/683

(56) References Cited

U.S. PATENT DOCUMENTS

| | | | |
|---|---|---|---|
| 4,787,719 A | * 11/1988 | Imai | ........................... 359/684 |
| 5,042,926 A | 8/1991 | Kikuchi | |
| 5,142,315 A | 8/1992 | Haraguchi et al. | |
| 5,266,992 A | 11/1993 | Takaoka et al. | |
| 5,850,577 A | 12/1998 | Ito | |

\* cited by examiner

*Primary Examiner*—Scott J. Sugarman
(74) *Attorney, Agent, or Firm*—Greenblum & Bernstein, P.L.C.

(57) ABSTRACT

A focusing method for a zoom lens system, including at least two lens groups, enables a portion of the zoom lens system to function as a focusing lens group over the entire focal length constituted by discrete focal length ranges. The portion of the zoom lens system, functioning as the focusing lens group, is changed to another portion thereof, in accordance with to the discrete focal length ranges.

7 Claims, 4 Drawing Sheets

FOCUSING METHOD FOR A ZOOM LENS SYSTEM

BACKGROUND OF THE INVENTION

1. Field of the Invention

The present invention relates to a focusing method for a zoom lens system.

2. Description of the Related Art

In conventional zoom lens systems, a front-focusing zoom lens system, in which the frontmost lens group out of a plurality of lens groups functions as a focusing lens group, has been widely used. In such a front-focusing zoom lens system, there is an advantage, i.e., the traveling distances of the focusing lens group are substantially the same regardless of the focal lengths. However, the diameter of the frontmost lens group is generally large, so that the frontmost lens group inevitably becomes heavy. Therefore the front-focusing zoom lens system is unsuitable for an AF camera in which the focusing lens group is driven through an electric motor. In the case of a mechanism for automatic focusing (AF mechanism) contained in the front-focusing zoom lens system, a driving mechanism for interconnecting the focusing lens group and a driving motor provided in the camera body becomes complicated (becoming large in size).

In an AF camera, if an attempt is made to miniaturize an electric drive mechanism and to increase the focusing speed, a lens group, which (i) is positioned close to the camera body, and (ii) generally has a small diameter, can advantageously be utilized as the focusing lens group. Accordingly, an inner-focusing lens system or a rear-focusing lens system have been often employed in AF cameras.

However, in conventional zoom lens systems, only a predetermined lens group is used, over the entire focal length constituted by a plurality of discrete focal length ranges, as the focusing lens group, no matter which focusing method is employed, i.e., any one of the front-focusing method, the inner-focusing method and the rear-focusing method. In other words, the above conventional zoom lens systems are required to move zoom lens groups along predetermined lens-group-moving paths at the time of zooming, and also required, at any discrete focal length ranges, to secure a space for the traveling distance of a lens group functioning as the focusing lens group from infinity to the shortest photographing distance. These requirements have to be satisfied even for discrete focal length ranges where distances between lens groups are short, i.e., where there is low freedom of movement of the lens groups. Consequently, these requirements have been obstacles when an attempt is made to miniaturize the zoom lens system, or to design a miniaturized zoom lens system with a high zoom ratio.

Furthermore, the zoom lens systems are classified into the two types, i.e., the telephoto zoom lens system including the positive lens group and the negative lens group in this order from the object, and the retrofocus zoom lens system including the negative lens group and the positive lens group in this order from the object. In the retrofocus zoom lens system, among the lens group from the second one or therebehind, there is a lens group, which has the transverse magnification, varying from a low magnification less than life-size magnification ($m=-1$) to a high magnification greater than life-size magnification (i.e., in a range including life-size magnification), with respect to an object at infinity in accordance with the change of the focal length of the entire zoom lens system. More concretely, the above lens group (hereinafter, the lens group with the life-size transverse magnification) can vary the transverse magnification of the lens group itself from a low magnification of less than the life-size magnification, passing through the life-size magnification ($m=-1$), to a high magnification of greater than the life-size magnification. A lens group with the life-size transverse magnification cannot be used as the focusing lens group. Accordingly, in the conventional retrofocus zoom lens system, since only a predetermined lens group is arranged to be the focusing lens group over the entire focal length, a lens group other than the lens group with the life-size magnification has to be used as the focusing lens group. This requirement has also been an obstacle when an attempt is made to miniaturize the zoom lens system, or to design a miniaturized zoom lens system with a high zoom ratio.

SUMMARY OF THE INVENTION

It is an object of the present invention to provide a focusing method for a zoom lens system, by which a miniaturized zoom lens system with a high zoom ratio can be obtained.

The present invention is based on a conception that a traveling distance for focusing, which is required to the focusing lens group, can easily be secured without causing interference between the focusing lens group and other lens groups, if one lens group to be the focusing lens group, which has conventionally been limited to a predetermined lens group only, is changed to another lens group, in accordance with the change of the discrete focal length ranges.

Furthermore, in regard to the retrofocus zoom lens system, the present invention is based on a conception that the lens group with the life-size transverse magnification, which has not been able to be used as the focusing lens group, can be used as the focusing lens group, if the lens group with the life-size transverse magnification is, not used as the focusing lens group at a focal length where the transverse magnification m becomes $-1$.

In order to achieve the above-mentioned object, there is provided a focusing method for a zoom lens system including at least two lens groups.

According to the focusing method, a portion of the zoom lens system is arranged to function as a focusing lens group over the entire focal length constituted by a plurality of discrete focal length ranges, and the portion functioning as the focusing lens group is changed to another portion, in accordance with to the discrete focal length ranges.

More concretely, in the case of the two-lens-group zoom lens system including a first lens group and a second lens group in this order from the object, in a predetermined discrete focal length range, the first lens group functions as the focusing lens group, whereas, in another predetermined discrete focal length range, the second lens group functions as the focusing lens group.

Furthermore, in the case of the three-lens-group zoom lens system including a first lens group, a second lens group and a third lens group in this order from the object, in a predetermined discrete focal length range, the second lens group functions as the focusing lens group, whereas, in another predetermined discrete focal length range, the third lens group functions as the focusing lens group. In this case, the first lens group can be a stationary lens group which is made immovable upon both zooming and focusing, or can be a zoom lens group which is made movable upon zooming.

Still further, in the case of the four-lens-group zoom lens system including a first lens group, a second lens group, a third lens group and a fourth lens group in this order from the object, in a predetermined discrete focal length range, the second lens group functions as the focusing lens group, whereas, in another predetermined discrete focal length range, the second and fourth lens groups are made integrally movable so that these two lens groups function as the focusing lens group. As an alternative, in a predetermined discrete focal length range, the second, third and fourth lens groups are made integrally movable so that these three lens groups function as the focusing lens group, whereas, in another predetermined discrete focal length range, the third and fourth lens groups are made integrally movable so that these two lens groups function as the focusing lens group.

In any of the above cases, according to the present invention, (i) the lens group with the life-size transverse magnification can be a part of the focusing lens group, and (ii) in that case, the lens group with the life-size transverse magnification can function as the focusing lens group in a predetermined discrete focal length range other than a discrete focal length range where the transverse magnification m becomes −1.

The present disclosure relates to subject matter contained in Japanese Patent Application No. 2000-097601 (filed on Mar. 31, 2000) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

[Embodiment 1]

Figure 1:
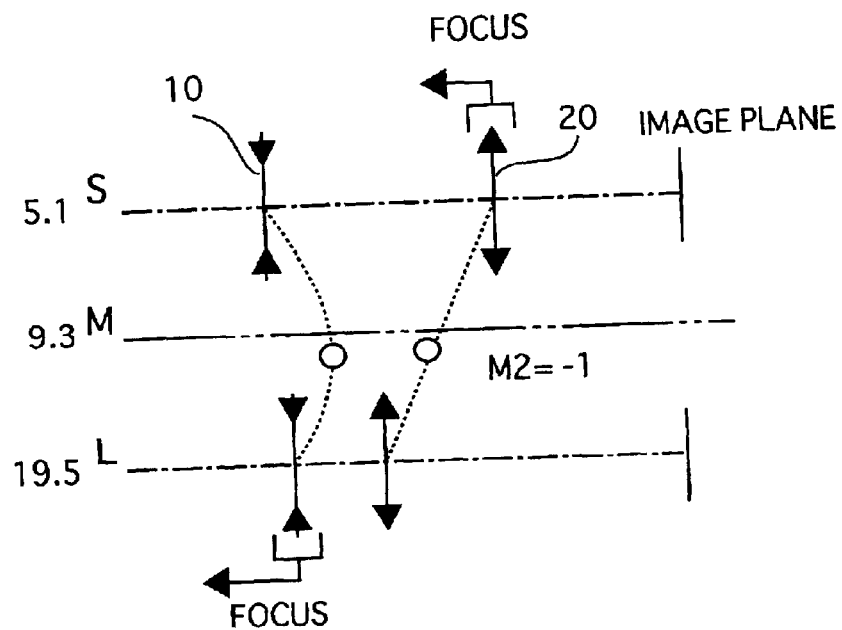
FIG. 1 is an optical diagram of a first embodiment of the focusing method, according to the present invention, which is applied to a two-lens-group zoom lens system.
Figure 2:
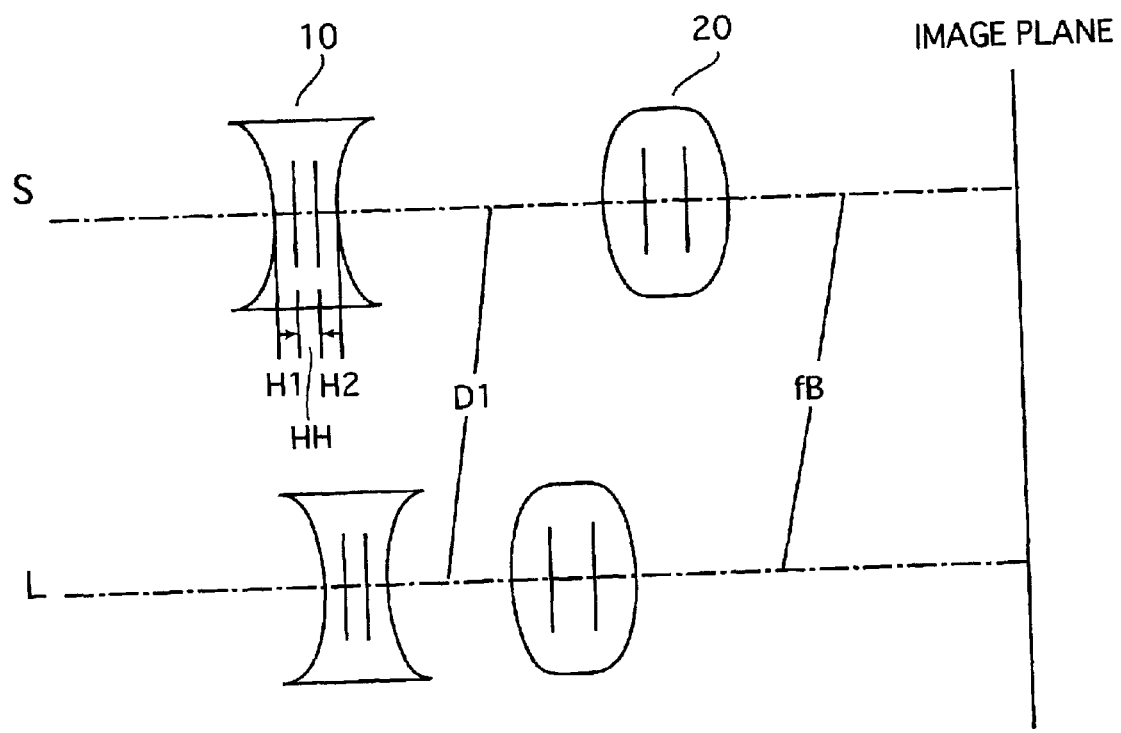
FIG. 2 is a diagram for indicating the symbols of the two-lens-group zoom lens system shown in FIG. 1.

FIGS. 1 and 2 show the first embodiment of the focusing method, according to the present invention, which is applied to a two-lens-group zoom lens system. This two-lens-group zoom lens system is a retrofocus zoom lens system including a negative first lens group 10 and a positive second lens group 20 in this order from the object. In the zoom lens system, upon zooming from the short focal length extremity S toward the long focal length extremity L, the first lens group 10, at first, moves toward the image, thereafter moves toward the object, while the second lens group 20 linearly moves toward the object.

According to the first embodiment, in a discrete focal length range from the short focal length extremity to an intermediate focal length (intermediate switching focal length) M, the second lens group 20 functions as the focusing lens group; and in a discrete focal length range from the intermediate focal length M to the long focal length extremity L, the first lens group 10 functions as the focusing lens group.

The second lens group 20 corresponds to a lens group which can vary the transverse magnification of the lens group (i.e., the second lens group itself) from a low magnification of less than a life-size magnification, passing through the life-size magnification (m=−1), to a high magnification of greater than the life-size magnification (i.e., the lens group with the life-size transverse magnification); however, the second lens group 20 is not used as the focusing lens group in a discrete focal length range in which the transverse magnification m of the second lens group becomes −1.

Tables 1a, 1b and 2 show numerical values for the two-lens-group zoom lens system according to the first embodiment shown FIG. 1. FIG. 2 is a diagram for indicating the symbols shown in tables 1a, 1b and 2, i.e., the first principal point H1 and the second principal point H2 with respect to the first lens group 10 and the second lens group 20; the distance HH between the first principal point H1 and the second principal point H2; the distance D1 between the first lens group 10 and the second lens group 20; the back focal distance fB.

The focal length is made variable from 5.1 (S) to 19.5 (L). At the focal length of 9.3 (M), the focusing lens group is changed from the second lens group 20 to the first lens group 10. In this first embodiment, the transverse magnification m of the second lens group 20 with respect to an object at infinity becomes the life-size magnification (m=−1) when the focal length of the entire zoom lens system is 10.98. Accordingly, the second lens group 20 functions as the focusing lens group in the discrete focal length range (5.1–9.3) where the transverse magnification m does not become −1. On the other hand, the first lens group 10 functions as the focusing lens group in the discrete focal length range (9.3–19.5), i.e., other than the discrete focal length range (5.1–9.3).

TABLE 1a

| Object Distance ODIS | ∞ | | | | |
|---|---|---|---|---|---|
| FNO | 2.8 | 3.5 | 4.2 | 4.8 | 5.4 |
| Focal Length f | 5.1 | 9.3 | 12.7 | 16.1 | 19.5 |
| Magnification (Mag) m | — | — | — | — | — |
| Half Angle of View ω | 35.8 | 20.8 | 15.5 | 12.3 | 10.2 |
| D1 | 20.09 | 9.70 | 6.27 | 4.28 | 2.99 |
| fB | 9.12 | 13.23 | 16.59 | 19.95 | 23.32 |
| Mag of 1st Lens Group | 0.000 | 0.000 | 0.000 | 0.000 | 0.000 |
| Mag of 2nd L/G | −0.468 | −0.847 | −1.156 | −1.466 | −1.777 |
| 1st L/G: Traveling Distance for Focusing | — | — | — | — | — |
| 2nd L/G: Traveling Distance for Focusing | — | — | — | — | — |

TABLE 1b

| Object Distance ODIS | 100 (Shortest Photographing Distance) | | | | |
|---|---|---|---|---|---|
| FNO | 2.8 | 3.5 | 4.2 | 4.8 | 5.4 |
| Focal Length f | — | — | — | — | — |

TABLE 1b-continued

| | | | | | |
|---|---|---|---|---|---|
| Magnification (Mag) m | −0.048 | −0.081 | −0.111 | −0.141 | −0.171 |
| Half Angle of View ω | — | — | — | — | — |
| D1 | 19.78 | 10.75 | 7.32 | 5.34 | 4.04 |
| fB | 9.43 | 13.23 | 16.59 | 19.95 | 23.32 |
| 1st L/G: Traveling Distance for Focusing | 0 | −1.06 | −1.06 | −1.06 | −1.06 |
| 2nd L/G: Traveling Distance for Focusing | −0.031 | 0 | 0 | 0 | 0 |

TABLE 2

| | f | H1 | HH | H2 |
|---|---|---|---|---|
| First Lens Group | −10.98 | 3.38 | 2.36 | 4.48 |
| Second Lens Group | 10.85 | −1.49 | 3.99 | 6.82 |

Note:
(1) The position of the first principal point H1 is measured from the object-side surface of the lens group, and an inner direction therefrom is defined as the positive direction;
(2) The position of the second principal point H2 is measured from the image-side surface of the lens group, and an inner direction therefrom is defined as the positive direction; and
(3) The above definitions (1) and (2) can be applied to other embodiments.

[Embodiment 2]

Figure 3:
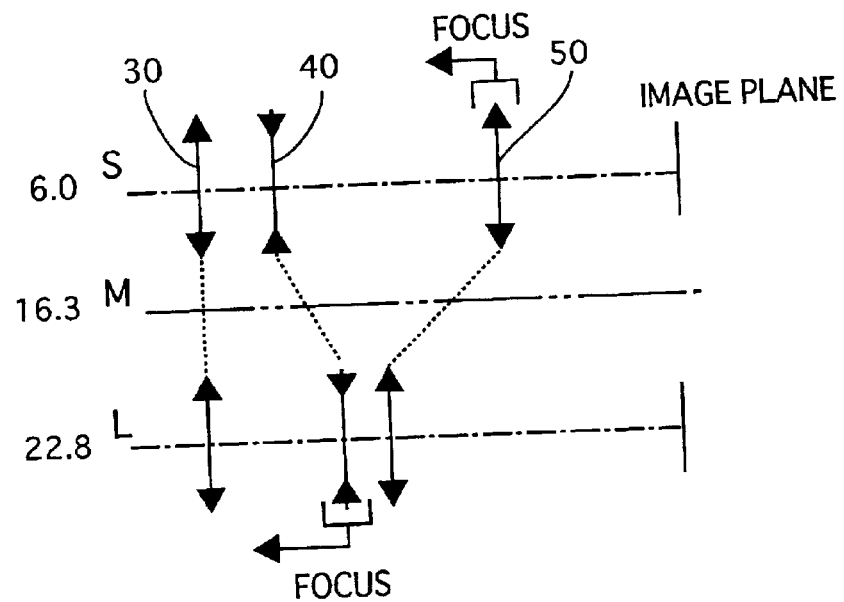
FIG. 3 is an optical diagram of a second embodiment of the focusing method, according to the present invention, which is applied to a three-lens-group zoom lens system.
Figure 4:
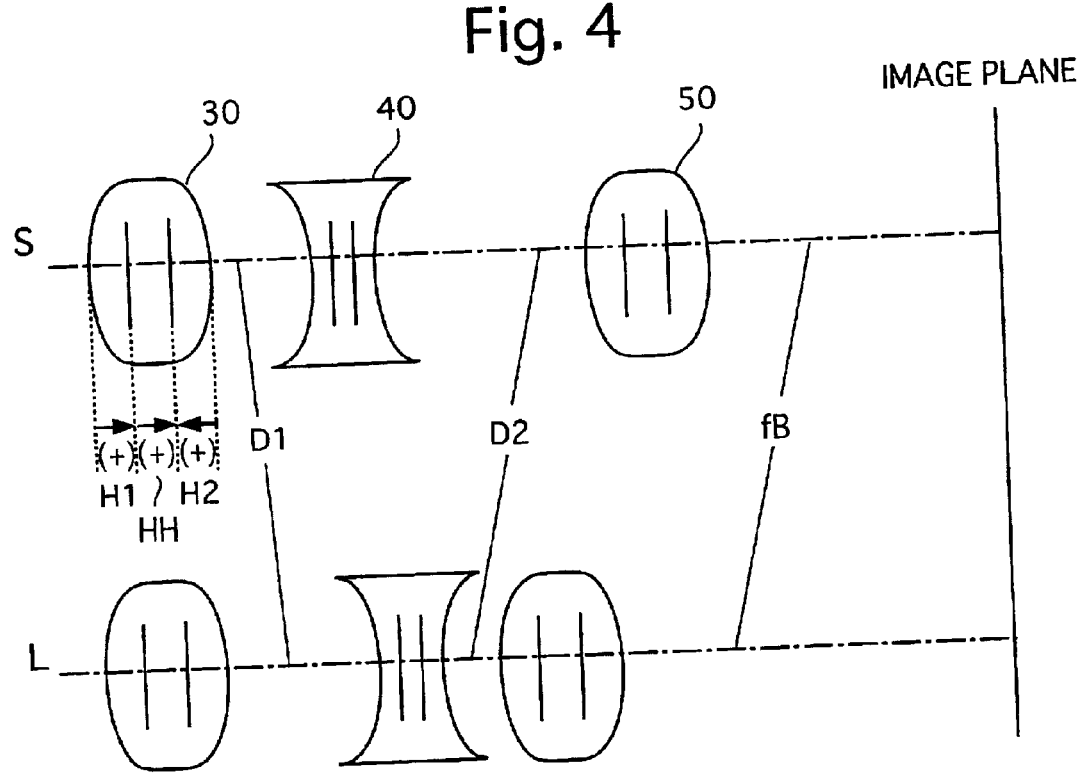
FIG. 4 is a diagram for indicating the symbols of the three-lens-group zoom lens system shown in FIG. 3.

FIGS. 3 and 4 show the second embodiment of the focusing method, according to the present invention, which is applied to a three-lens-group zoom lens system. This three-lens-group zoom lens includes a positive first lens group 30, a negative second lens group 40 and a positive third lens group 50 in this order from the object. In the zoom lens system, upon zooming from the short focal length extremity S toward the long focal length extremity L, the second lens group 40 linearly moves toward the image, and the third lens group 50 linearly moves toward the object. The first lens group 30 is made stationary.

According to the second embodiment, in the discrete focal length range from the short focal length extremity S to the intermediate focal length (intermediate switching focal length) M, the third lens group 50 functions as the focusing lens group; and in the discrete focal length range from the intermediate focal length M to the long focal length extremity L, the second lens group 40 functions as the focusing lens group. Tables 3a, 3b and 4 show numerical values for the three-lens-group zoom lens system according to the second embodiment shown FIG. 3. FIG. 4 is a diagram for indicating the symbols shown in tables 3a, 3b and 4.

The focal length is made variable from 6.0 (S) to 22.8 (L). At the focal length of 16.3 (M), the focusing lens group is changed from the third lens group 50 to the second lens group 40.

In this embodiment, in a discrete focal length range where the distance between the second lens group 40 and the third lens group 50 is sufficiently long, the third lens group 50 functions as the focusing lens group, while in a discrete focal length range where the distance between the second lens group 40 and the third lens group 50 is short, the second lens group 40 functions as the focusing lens group.

TABLE 3a

| | | | | | |
|---|---|---|---|---|---|
| Object Distance ODIS | | | ∞ | | |
| FNO | 2.8 | 2.9 | 3.1 | 3.3 | 3.5 |
| Focal Length f | 6.0 | 8.4 | 11.7 | 16.3 | 22.8 |

TABLE 3a-continued

| | | | | | |
|---|---|---|---|---|---|
| Magnification (Mag) m | — | — | — | — | — |
| Half Angle of View ω | 32.4 | 23.2 | 16.8 | 12.2 | 8.83 |
| D1 | 2.95 | 6.73 | 9.99 | 12.54 | 14.7 |
| D2 | 19.80 | 15.22 | 11.11 | 7.35 | 3.83 |
| fB | 8.34 | 9.14 | 10.08 | 11.19 | 9.14 |
| Mag of 1st Lens Group | 0.000 | 0.000 | 0.000 | 0.000 | 0.000 |
| Mag of 2nd L/G | −0.366 | −0.436 | −0.518 | −0.615 | −0.726 |
| Mag of 3rd L/G | −0.414 | −0.486 | −0.570 | −0.671 | −0.793 |
| 2nd L/G: Traveling Distance for Focusing | — | — | — | — | — |
| 3rd L/G: Traveling Distance for Focusing | — | — | — | — | — |

TABLE 3b

| | | | | | |
|---|---|---|---|---|---|
| Object Distance ODIS | | | 100 | | |
| | | (Shortest Photographing Distance) | | | |
| FNO | 2.8 | 2.9 | 3.1 | 3.3 | 3.5 |
| Focal Length f | — | — | — | — | — |
| Magnification (Mag) m | −0.051 | −0.068 | −0.100 | −0.087 | −0.105 |
| Half Angle of View ω | — | — | — | — | — |
| D1 | 2.95 | 6.73 | 9.90 | 8.95 | 10.2 |
| D2 | 19.43 | 14.43 | 9.06 | 10.95 | 8.34 |
| fB | 7.97 | 7.56 | 6.29 | 11.19 | 9.14 |
| 2nd L/G: Traveling Distance for Focusing | 0 | 0 | 0 | −3.59 | −4.50 |
| 3rd L/G: Traveling Distance for Focusing | −0.37 | −1.58 | −3.79 | 0 | 0 |

TABLE 4

| | f | H1 | HH | H2 |
|---|---|---|---|---|
| First Lens Group | 39.58 | 1.43 | 3.57 | 4.05 |
| Second Lens Group | −8.69 | 0.18 | 1.43 | 5.48 |
| Third Lens Group | 11.11 | 0.81 | 2.34 | 7.37 |

[Embodiment 3]

Figure 5:
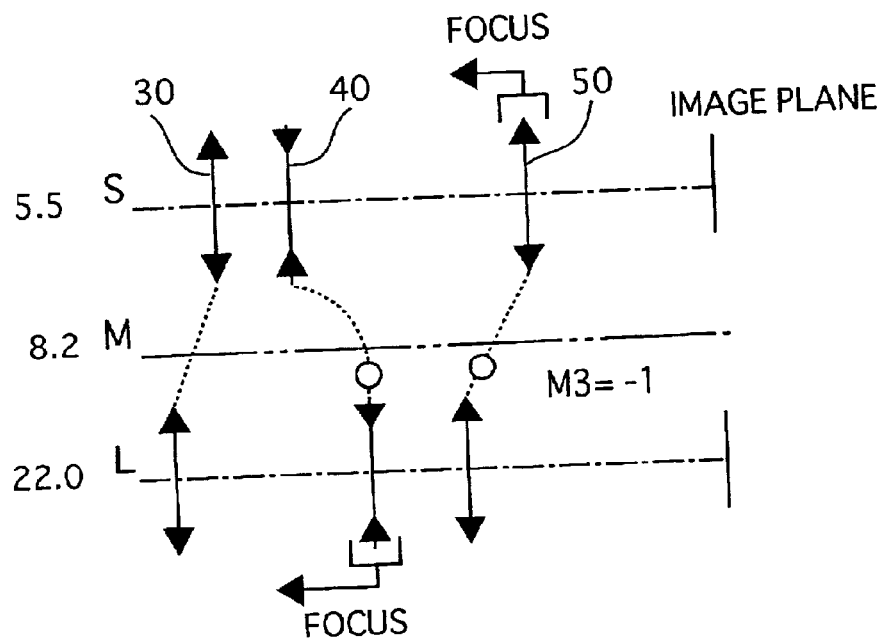
FIG. 5 is an optical diagram of a third embodiment of the focusing method, according to the present invention, which is applied to the three-lens-group zoom lens system.

FIG. 5 shows the third embodiment of the focusing method, according to the present invention, which is applied to a three-lens-group zoom lens system. This three-lens-group zoom lens includes a positive first lens group 30, a negative second lens group 40 and a positive third lens group 50 in this order from the object. According to the second embodiment shown in FIG. 3, the first lens group 30 is made stationary upon zooming. On the other hand, as shown in FIG. 5, in the third embodiment, the first lens group 30 is a zoom lens group which is made moveable upon zooming.

In the zoom lens system of the third embodiment, upon zooming from the short focal length extremity S toward the long focal length extremity L, the first lens group 30 linearly moves toward the object, the second lens group 40 linearly moves toward the image, and the third lens group 50 linearly moves toward the object.

Similar to the second embodiment shown in FIG. 3, the switching of the focusing lens group in the third embodiment is carried out according to the following:

in the discrete focal length range from the short focal length extremity S to the intermediate focal length (intermediate switching focal length) M, the third lens group 50 functions as the focusing lens group; and in the discrete focal length range from the intermediate focal length M to the long focal length extremity L, the second lens group 40 functions as the focusing lens group.

The third lens group 50 corresponds to the lens group with the life-size transverse magnification; however, the third lens group 50 is not used as the focusing lens group in the discrete focal length range where the transverse magnification m of the third lens group becomes −1.

Tables 5a, 5b and 6 show numerical values for the three-lens-group zoom lens system according to the third embodiment shown in FIG. 5. The symbols of shown in tables 5a, 5b and 6 are defined in the same manner as the second embodiment (refer to FIG. 4). More concretely, the focal length is made variable from 5.5 (S) to 22.0 (L). At the focal length of 8.2 (M), the focusing lens group is changed from the third lens group 50 to the second lens group 40. In the third embodiment, the transverse magnification m of the third lens group 50 with respect to an object at infinity becomes the life-size magnification (m=−1) when the focal length of the entire zoom lens system is 20.5.

TABLE 5a

| Object Distance ODIS | ∞ | | | | |
|---|---|---|---|---|---|
| FNO | 2.8 | 3.0 | 3.2 | 3.6 | 3.9 |
| Focal Length f | 5.5 | 8.2 | 11.0 | 16.0 | 22.0 |
| Magnification (Mag) m | — | — | — | — | — |
| Half Angle of View ω | 33.8 | 23.6 | 18 | 12.6 | 9.25 |
| D1 | 2.50 | 8.071 | 11.61 | 15.57 | 18.56 |
| D2 | 17.76 | 12.52 | 9.284 | 5.79 | 3.28 |
| fB | 10.05 | 11.39 | 12.61 | 14.49 | 16.40 |
| Mag of $1^{st}$ Lens Group | 0.000 | 0.000 | 0.000 | 0.000 | 0.000 |
| Mag of $2^{nd}$ L/G | −0.219 | −0.258 | −0.292 | −0.341 | −0.39 |
| Mag of $3^{rd}$ L/G | −0.465 | −0.587 | −0.698 | −0.868 | −1.042 |
| $2^{nd}$ L/G: Traveling Distance for Focusing | — | — | — | — | — |
| $3^{rd}$ L/G: Traveling Distance for Focusing | — | — | — | — | — |

TABLE 5b

| Object Distance ODIS | 100 (Shortest Photographing Distance) | | | | |
|---|---|---|---|---|---|
| FNO | 2.8 | 3.0 | 3.2 | 3.6 | 3.9 |
| Focal Length f | — | — | — | — | — |
| Magnification (Mag) m | −0.047 | −0.058 | −0.071 | −0.092 | −0.114 |
| Half Angle of View ω | — | — | — | — | — |
| D1 | 2.5 | 6.73 | 9.90 | 8.95 | 10.2 |
| D2 | 17.42 | 14.43 | 9.06 | 10.95 | 8.34 |
| fB | 10.39 | 11.39 | 12.61 | 11.19 | 9.14 |
| $2^{nd}$ L/G: Traveling Distance for Focusing | 0 | −1.34 | −1.71 | −6.62 | −8.36 |
| $3^{rd}$ L/G: Traveling Distance for Focusing | −0.34 | 0 | 0 | 0 | 0 |

TABLE 6

| | f | H1 | HH | H2 |
|---|---|---|---|---|
| First Lens Group | 54.06 | −0.57 | 3.98 | 5.91 |
| Second Lens Group | −8.02 | 1.04 | 1.90 | 5.19 |
| Third Lens Group | 11.00 | 1.93 | 0.81 | 6.06 |

[Embodiment 4]

Figure 6:
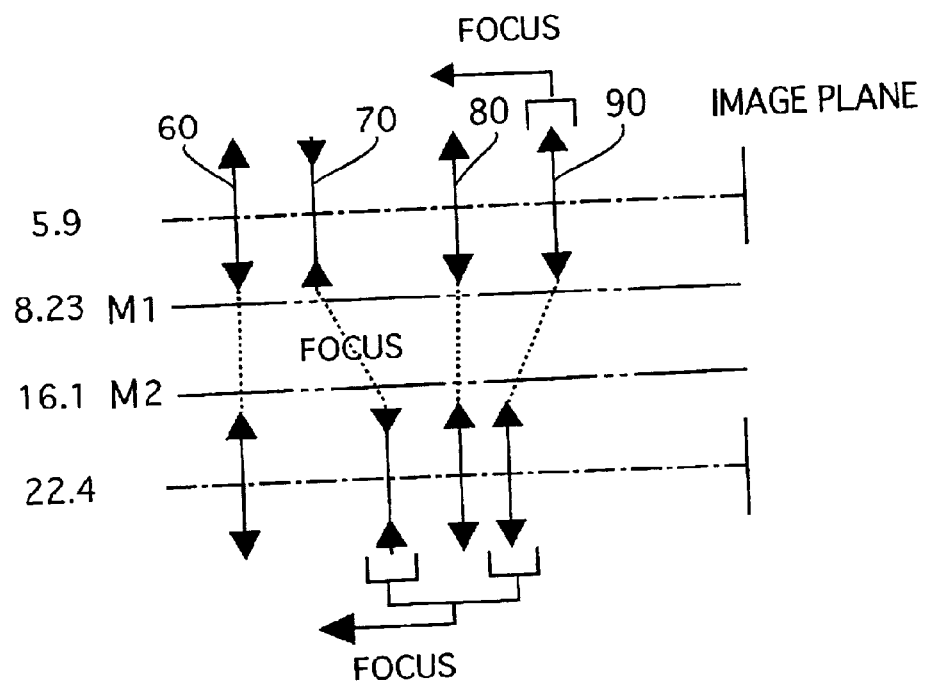
FIG. 6 is an optical diagram of a fourth embodiment of the focusing method, according to the present invention, which is applied to a four-lens-group zoom lens system.
Figure 7:
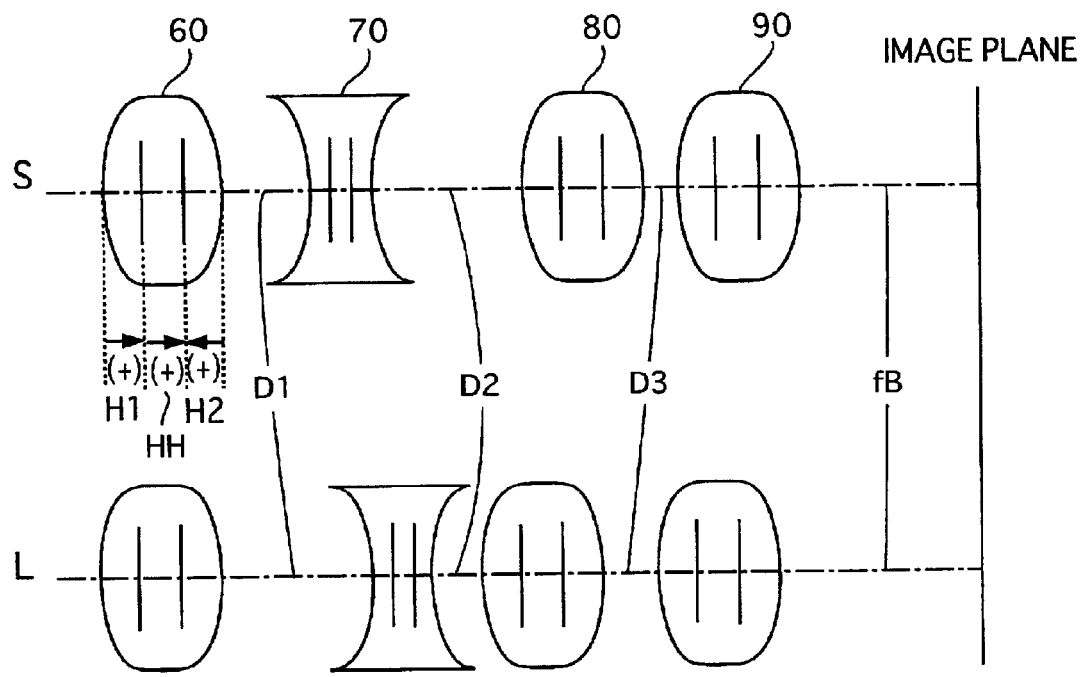
FIG. 7 is a diagram for indicating the symbols of the four-lens-group zoom lens system shown in FIG. 6.

FIGS. 6 and 7 show the fourth embodiment of the focusing method, according to the present invention, which is applied to a four-lens-group zoom lens system. This four-lens-group zoom lens system includes a positive first lens group 60 and a negative second lens group 70, a positive third lens group 80 and a positive fourth lens group 90 in this order from the object. In the zoom lens system, upon zooming from the short focal length extremity S toward the long focal length extremity L, the second lens group 70 linearly moves toward the image, and the fourth lens group 90 linearly moves toward the object. The first lens group 60 and the third lens group 80 are made stationary.

According to the fourth embodiment, in a discrete focal length range from the short focal length extremity S to a predetermined focal length (M1), only the fourth lens group 90 functions as the focusing lens group;

in a discrete focal length range from the predetermined focal length (M1)to another predetermined focal length (M2), only the second lens group 70 functions as the focusing lens group; and in a discrete focal length range from the other predetermined focal length (M2) to the long focal length extremity L, the second lens group 70 and the fourth lens group 90 are made integrally movable so that these two lens groups function as the focusing lens group.

The second lens group 70 corresponds to the lens group with the life-size transverse magnification; however, the second lens group 70 alone is not used as the focusing lens group in the discrete focal length range in which the transverse magnification m of the second lens group becomes −1.

Tables 7a, 7b and 8 show numerical values for the four-lens-group zoom lens system according to the fourth embodiment shown FIG. 6. FIG. 7 is a diagram for indicating the symbols shown in tables 7a, 7b and 8.

The focal length is made variable from 5.9 (S) to 22.4 (L). In a discrete focal length range from 5.9–8.23 (M1), only the fourth lens group 90 functions as the focusing lens group;

in a discrete focal length range from 8.23 (M1)-16.1 (M2), only the second lens group 70 functions as the focusing lens group.

in a discrete focal length range from 16.1 (M2)to 22.4 (L), the second lens group 70 and the fourth lens group 90 are made integrally movable so that these two lens groups function as the focusing lens group.

In the fourth embodiment, the transverse magnification m of the second lens group 70 with respect to an object at infinity becomes the life-size magnification (m=−1) when the focal length of the entire zoom lens system is 19.7.

TABLE 7a

| Object Distance ODIS | ∞ | | | | |
|---|---|---|---|---|---|
| FNO | 2.8 | 2.9 | 2.9 | 3 | 3.0 |
| Focal Length f | 5.90 | 8.23 | 11.5 | 16.1 | 22.4 |
| Magnification (Mag) m | — | — | — | — | — |
| Half Angle of View ω | 31.7 | 22.5 | 16.4 | 11.9 | 8.5 |
| D1 | 2.01 | 4.92 | 7.44 | 9.67 | 11.76 |
| D2 | 12.57 | 9.66 | 7.14 | 4.91 | 2.82 |
| D3 | 4.52 | 3.71 | 2.98 | 2.45 | 2.4 |
| fB | 9.38 | 10.19 | 11.73 | 13.81 | 15.94 |
| Mag of $1^{st}$ Lens Group | 0.000 | 0.000 | 0.000 | 0.000 | 0.000 |
| Mag of $2^{nd}$ L/G | −0.411 | −0.509 | −0.640 | −0.831 | −1.152 |
| Mag of $3^{rd}$ L/G | −2.821 | −4.501 | −8.031 | −15.515 | −16.879 |
| Mag of $4^{th}$ L/G | 0.195 | 0.138 | 0.086 | 0.048 | 0.044 |
| $2^{nd}$ L/G: Traveling Distance for Focusing | — | — | — | — | — |
| 4th L/G: Traveling Distance for Focusing | — | — | — | — | — |

TABLE 7b

| Object Distance ODIS | 100 (Shortest Photographing Distance) | | | | |
|---|---|---|---|---|---|
| FNO | 2.8 | 2.9 | 2.9 | 3.0 | 3.0 |
| Focal Length f | — | — | — | — | — |
| Magnification (Mag) m | −0.049 | −0.064 | −0.082 | −0.079 | −0.080 |
| Half Angle of View ω | — | — | — | — | — |
| D1 | 1.78 | 4.52 | 6.77 | 6.49 | 6.59 |
| D2 | 12.8 | 10.05 | 7.81 | 8.09 | 7.98 |
| D3 | 4.28 | 3.32 | 2.31 | 2.45 | 2.4 |
| fB | 9.61 | 10.57 | 11.58 | 11.46 | 11.51 |

TABLE 7b-continued

| | | | | | |
|---|---|---|---|---|---|
| $2^{nd}$ L/G: Traveling Distance for Focusing | 0 | −0.40 | −0.67 | −1.14 | −1.99 |
| $4^{th}$ L/G: Traveling Distance for Focusing | −0.24 | 0 | 0 | −1.14 | −1.99 |

TABLE 8

| | f | H1 | HH | H2 |
|---|---|---|---|---|
| First Lens Group | 26.12 | 4.17 | 3.51 | 2.22 |
| Second Lens Group | −6.23 | 0.51 | 1.84 | 3.41 |
| Third Lens Group | 17.39 | −1.21 | 1.58 | 2.93 |
| Fourth Lens Group | 14.08 | 0.83 | 1.51 | 1.96 |

[Embodiment 5]

Figure 8:
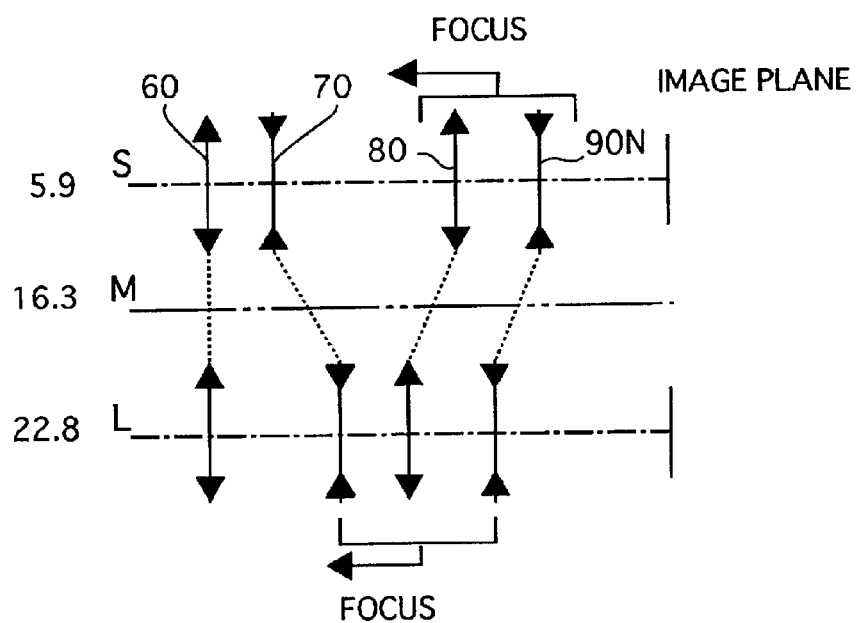
FIG. 8 is an optical diagram of a fifth embodiment of the focusing method, according to the present invention, which is applied to the four-lens-group zoom lens system.

FIG. 8 is an optical diagram of a fifth embodiment of the focusing method, according to the present invention, which is applied to the four-lens-group zoom lens system.

The fifth embodiment is different from the fourth embodiment on the following points:

(i) the positive fourth lens group 90 is changed to the negative fourth lens group 90N; and (ii) upon zooming from the short focal length extremity (S) to the long focal length extremity (L), the positive third lens group 80 linearly moves toward the object.

According to the fifth embodiment, in the discrete focal length range from the short focal length extremity S to the intermediate focal length (intermediate switching focal length) M, the third lens group 80 and the fourth lens group 90 are made integrally movable so that these two lens group function as the focusing lens group; and in the discrete focal length range from the intermediate focal length M to the long focal length extremity L, the second lens group 70, the third lens group 80 and the fourth lens group 90 are made integrally movable so that these three lens groups function as the focusing lens group.

The second lens group 70 corresponds to the lens group with the life-size transverse magnification; however, the second lens group 70 alone is not used as the focusing lens group in the focal length range in which the transverse magnification m of the second lens group is −1.

Tables 9a, 9b and 10 show numerical values for the four-lens-group zoom lens system according to the fifth embodiment shown FIG. 8. The symbols shown in the tables 9a, 9b and 10 are defined in the same manner as FIG. 7.

The focal length is made variable from 5.9 (S) to 22.8 (L). In a discrete focal length range from 5.9–16.3 (M), the third lens group 80 and the fourth lens group 90N which are made integrally movable so that these two lens groups function as the focusing lens group; and in a discrete focal length range from 16.3–22.8, the second lens group 70, the third lens group 80 and the fourth lens group 90N are made integrally movable so that these three lens groups function as the focusing lens group.

In the fifth embodiment, the transverse magnification m of the second lens group 70 with respect to an object at infinity becomes the life-size magnification (m=−1) when the focal length of the entire zoom lens system is 20.7.

TABLE 9a

| Object Distance ODIS | ∞ | | | | |
|---|---|---|---|---|---|
| FNO | 2.8 | 2.9 | 3 | 3.1 | 3.2 |
| Focal Length f | 5.90 | 8.24 | 11.5 | 16.3 | 22.8 |
| Magnification (Mag) m | — | — | — | — | — |
| Half Angle of View ω | 31.9 | 23.2 | 16.8 | 12.1 | 8.7 |
| D1 | 2.29 | 5.64 | 8.55 | 11.2 | 13.7 |
| D2 | 14.68 | 10.8 | 7.35 | 4.25 | 1.57 |
| D3 | 1.20 | 1.31 | 1.41 | 1.51 | 1.53 |
| fB | 6.91 | 7.33 | 7.77 | 8.14 | 8.25 |
| Mag of $1^{st}$ Lens Group | 0.000 | 0.000 | 0.000 | 0.000 | 0.000 |
| Mag of $2^{nd}$ L/G | −0.419 | −0.511 | −0.632 | −0.804 | −1.090 |
| Mag of $3^{rd}$ L/G | −0.295 | −0.334 | −0.375 | −0.409 | −0.419 |
| Mag of $4^{th}$ L/G | 1.430 | 1.441 | 1.453 | 1.463 | 1.466 |
| $2^{nd}$ L/G: Traveling Distance for Focusing | — | — | — | — | — |
| $3^{rd}$ L/G: Traveling Distance for Focusing | — | — | — | — | — |
| $4^{th}$ L/G: Traveling Distance for Focusing | — | — | — | — | — |

TABLE 9b

| Object Distance ODIS | 100 (Shortest Photographing Distance) | | | | |
|---|---|---|---|---|---|
| FNO | 2.8 | 2.9 | 3.0 | 3.1 | 3.2 |
| Focal Length f | — | — | — | — | — |
| Magnification (Mag) m | −0.050 | −0.067 | −0.096 | −1.080 | −0.139 |
| Half Angle of View ω | — | — | — | — | — |
| D1 | 2.29 | 5.64 | 8.55 | 9.24 | 9.89 |
| D2 | 14.31 | 10.04 | 5.52 | 4.25 | 1.57 |
| D3 | 1.20 | 1.31 | 1.41 | 1.51 | 1.53 |
| fB | 7.27 | 8.51 | 10.46 | 8.50 | 8.61 |
| $2^{nd}$ L/G: Traveling Distance for Focusing | 0 | 0 | 0 | 3.17 | 5.17 |
| $3^{rd}$ L/G: Traveling Distance for Focusing | −0.36 | −1.18 | −2.69 | −3.17 | −5.17 |
| $4^{th}$ L/G: Traveling Distance for Focusing | −0.36 | −1.18 | −2.69 | −3.17 | −5.17 |

TABLE 10

| | f | H1 | HH | H2 |
|---|---|---|---|---|
| First Lens Group | 33.43 | 1.37 | 3.90 | 4.56 |
| Second Lens Group | −7.78 | 0.23 | 1.03 | 6.36 |
| Third Lens Group | 7.81 | 2.25 | 1.32 | 2.80 |
| Fourth Lens Group | −36.36 | −4.81 | −0.04 | 8.71 |

A practical structure for driving each lens group has been known to those who are skilled in the art. In recent cameras, particularly in digital cameras, it is a general practice for those who are skilled in the art to digitally control the position of each lens group. In such a digitally controlled camera, the switching of the focusing lens groups can be easily carried out. Furthermore, it is common for the zoom lens system to control the focal length according to predetermined number of discrete steps. In such a stepwise zoom lens system, the position data of each lens group for each discrete focal length range can be stored in a table, so that the amount of data thereof is reduced. Accordingly, the switching of the focusing lens groups can more easily be carried out.

According to the focusing method of the present invention, a lens group to function as the focusing lens group can be changed to another lens group, in accordance with discrete focal length ranges, thereby the zoom lens system can be miniaturized, or a miniaturized zoom lens system with a high zoom ratio can be obtained.

What is claimed is:

1. A focusing method for a zoom lens system comprising at least two lens groups, said focusing method comprising:

operating a portion of said zoom lens system as a focusing lens group over the entire focal length range of the zoom lens system, the entire focal length range comprising a plurality of discrete focal length ranges; and changing the portion of said zoom lens system, which functions as said focusing lens group, from a first portion to a second portion, in accordance with the discrete focal length ranges, wherein said focusing lens group comprises a lens group with a transverse magnification that becomes −1 at a discrete focal length of said zoom lens system during zooming; and wherein said lens group functions as said focusing lens group in a discrete focal length range that does not include said discrete focal length range of the zoom lens system.

2. The focusing method according to claim 1, wherein said zoom lens system comprises a first lens group and a second lens group in this order from an object;

wherein in a predetermined discrete focal length range, said first lens group functions as said focusing lens group; and wherein in another predetermined discrete focal length range, said second lens group functions as said focusing lens group.

3. The focusing method according to claim 1, wherein said zoom lens system comprises a first lens group, a second lens group and a third lens group in this order from an object;

wherein in a predetermined discrete focal length range, said second lens group functions as said focusing lens group; and wherein in another predetermined discrete focal length range, said third lens group functions as said focusing lens group.

4. The focusing method according to claim 3, wherein said first lens group is immovable upon both zooming and focusing.

5. The focusing method according to claim 3, wherein said first lens group is moveable upon zooming.

6. The focusing method according to claim 1, wherein said zoom lens system comprises a first lens group, a second lens group, a third lens group and a fourth lens group in this order from an object;

wherein in a predetermined discrete focal length range, said second lens group functions as said focusing lens group; and wherein in another predetermined discrete focal length range, said second and fourth lens groups move integrally and said second and fourth lens groups function as said focusing lens group.

7. The focusing method according to claim 1, wherein said zoom lens system comprises a first lens group, a second lens group, a third lens group and a fourth lens group in this order from an object;

wherein in a predetermined discrete focal length range, said second, third and fourth lens groups are movable integrally and said first, second and third lens groups function as said focusing lens group; and wherein in another predetermined discrete focal length range, said third and fourth lens groups are movable integrally and said third and fourth lens groups function as said focusing lens group.

* * * * *